US007290086B2

(12) United States Patent
Beardsley et al.

(10) Patent No.: US 7,290,086 B2
(45) Date of Patent: Oct. 30, 2007

(54) METHOD, APPARATUS AND PROGRAM STORAGE DEVICE FOR PROVIDING ASYNCHRONOUS STATUS MESSAGING IN A DATA STORAGE SYSTEM

(75) Inventors: Brent C. Beardsley, Tucson, AZ (US); Minh-Ngoc Le Huynh, San Jose, CA (US); William F. Micka, Tucson, AZ (US); Satish Chandra Penmetsa, San Jose, CA (US); Richard A. Schaeffer, Antioch, CA (US); Kaukab Uddin, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 10/448,022

(22) Filed: May 28, 2003

(65) Prior Publication Data

US 2004/0243737 A1    Dec. 2, 2004

(51) Int. Cl.
*G06F 12/00* (2006.01)
(52) U.S. Cl. .................. 711/114; 711/162; 711/170
(58) Field of Classification Search .................. None
See application file for complete search history.

(56) References Cited

U.S. PATENT DOCUMENTS

| 4,918,645 A * | 4/1990 | Lagoy, Jr. .................. 711/151 |
| 5,696,899 A | 12/1997 | Kalwitz |
| 5,991,829 A | 11/1999 | Giorgio et al. |
| 6,078,968 A | 6/2000 | Lo et al. |
| 6,260,079 B1 | 7/2001 | White |
| 6,314,477 B1 | 11/2001 | Cowger et al. |
| 2003/0070053 A1* | 4/2003 | Gallo et al. .................. 711/170 |

FOREIGN PATENT DOCUMENTS

| JP | 05-073463 | 3/1993 |
| JP | 10-003717 | 1/1998 |

OTHER PUBLICATIONS

Lochner, D.L., "Intelligent PC Adapter Card for SCSI Devices," *IBM Technical Disclosure Bulletin*, vol. 32, No. 8A,, Jan. 1990.
McNeill, A.B. and Wachtel, E.I., "Automatic Target Mode for the Small Computer System Interface," *IBM Technical Disclosure Bulletin*, vol. 33, No. 5, Oct. 1990.
Morales, C., "Software Solution for coordinating a Small Computer System Interface with Multiple Drives," *IBM Technical Disclosure Bulletin*, vol. 38, No. 67, Jun. 1995.
"Managing Queue Full Status for Small Computer System Interface, Version 2," *IBM Technical Disclosure Bulletin*, vol. 38, No. 7, Jul. 1995.

* cited by examiner

*Primary Examiner*—Reginald Bragdon
*Assistant Examiner*—Mehdi Namazi
(74) *Attorney, Agent, or Firm*—David W. Lynch; Chambliss, Banner & Stophel PC

(57) ABSTRACT

A method, apparatus and program storage device for providing asynchronous status messaging in a data storage system Asynchronous events are returned from a target to an initiator in response to a Read Message from the initiator. The return status message may or may not be associated with a previously given command or Logical Unit (LUN).

13 Claims, 7 Drawing Sheets

METHOD, APPARATUS AND PROGRAM STORAGE DEVICE FOR PROVIDING ASYNCHRONOUS STATUS MESSAGING IN A DATA STORAGE SYSTEM

BACKGROUND OF THE INVENTION

1. Field of the Invention

This invention relates in general to data storage systems, and more particularly to a method, apparatus and program storage device for providing asynchronous status messaging in a data storage system.

2. Description of Related Art

Business organizations often insist on continuous availability to critical data twenty four hours a day, every day of the year. For many businesses and organizations, such as banks and other financial institutions, the inability to access data for any period of time could lead to loss of financial transactions, financial losses, loss of credibility and reliability with customers, and maybe even a total failure of the business. Therefore, the ability to provide continuous availability to data for the mission critical applications is often a necessity for business survival.

Generally, data backup systems copy a designated group of source data, such as a file, volume, storage device, partition, etc. If the source data is lost, applications can use the backup copy instead of the original, source data. The similarity between the backup copy and the source data may vary, depending upon how often the backup copy is updated to match the source data. If the backup copy is updated in step with the source data, the copy is said to be a "mirror" of the source data, and is always "consistent" with the source data.

As can be seen, a key feature of any disaster recovery system is the backup of critical data and updates to such backed-up data as soon as possible. The simplest method of backing up data is with off-site backups. However, the extent of successful data recovery in the event of failure is dependent upon the frequency of updates to the backed-up data. One data back-up system is the Peer-to-Peer Remote Copy (PPRC) function offered by International Business Machines, Corporation (IBM), the assignee of the subject patent application. PPRC provides synchronous copying of data from a primary system to a remote (secondary) system. With PPRC, primary storage devices are coupled to counterpart secondary devices by suitable communications links. Often, both the primary and secondary systems include a non-volatile storage unit (NVS), such as a battery backed up storage unit, to maintain data in the event of a power or system failure. With PPRC, when data is written to the primary NVS, the data is then transferred to the NVS in the secondary controller. At later points in time, the data in the primary and secondary NVSs will be destaged to the attached storage devices. With PPRC, there is minimal risk of losing data upon the occurrence of a failure because data is at the secondary controller synchronously with updates to the data at the primary DASD managed by the primary controller.

The primary and remote system may be connected by using a proprietary system, such as Enterprise System Connection (ESCON®) or Fibre Connection (FICON™), or by using an open system. An open system is a system whose characteristics comply with standards made available throughout the industry, such as SCSI and fibre-channel (FC) systems. Proprietary systems use an interrupt protocol to provide synchronous operation between the two systems thereby facilitating messaging and event notification between the two systems. However, open systems, such as SCSI and fibre-channel, do not use interrupts. A device that begins a SCSI transaction issues a command to another device (the SCSI target) thereby giving the SCSI target a task to perform. Typically a SCSI host adapter is the initiator, but targets may also become initiators. Still, the primary and secondary system connected by a physical connection or fibre channel operate asynchronously. Thus, asynchronous events on a SCSI controller cannot be returned to a host initiator or peer subsystem initiator. Accordingly, such events go undetected by the initiator until a command completes or terminates.

It can be seen then that there is a need for a method, apparatus and program storage device for providing asynchronous status messaging in a data storage system.

SUMMARY OF THE INVENTION

To overcome the limitations in the prior art described above, and to overcome other limitations that will become apparent upon reading and understanding the present specification, the present invention discloses a method, apparatus and program storage device for providing asynchronous status messaging in a data storage system.

The present invention solves the above-described problems by providing a way to timely return asynchronous events to a host initiator or peer subsystem initiator. The asynchronous events may or may not be associated with a given command or Logical Unit (LUN). The messages that are returned may contain status information to an extended command operation, e.g., a command that previously returned a status presentation, but which still has back end work being performed on a controller; a controller resource transition; or any event that the target controller needs to communicate back to the initiating controller or host initiator.

A fixed block adapter in accordance with the principles of the present invention includes a host adapter module for transferring information to and from said physical connection and a processor, coupled to the host adapter module, the processor being configured to cause the host adapter module to transmit a Read Message to a target for returning asynchronous event information.

In another embodiment of the present invention, another fixed block adapter is provided. The fixed block adapter includes a host adapter module for transferring information to and from said physical connection and a processor, coupled to the host adapter module, the processor being configured to generate a return message providing asynchronous event information in response to receipt of a Read Message.

In another embodiment of the present invention, a method for providing asynchronous status messaging is provided. The method includes sending a Read Message from an initiator to a target, monitoring command completion at the target, determining whether return status data is available in response to the Read Message when a command completes, returning a No Message to the initiator when return status data is not available and returning return status data to the initiator when return status data is available.

In another embodiment of the present invention, a storage system is provided. The storage system includes a first storage system, the first storage system including a first cluster processor complex, a first fixed block adapter and a first storage array, a first host coupled to the first storage system, a second storage system, the second storage system including a second cluster processor complex, a second fixed block adapter and a second storage array, a second host coupled to the first storage system and an open source path coupling the first and second storage systems, wherein the first cluster processor complex and first fixed block adapter of the first storage system are configured to provide asynchronous status messaging by transmitting a Read Message to the second fixed block adapter, wherein the Read Message requests return of asynchronous event information from the second storage system.

In another embodiment of the present invention, a storage system is provided. The storage system includes a first cluster processor complex, a first fixed block adapter coupled to the first cluster processor complex and a first storage array coupled to the first cluster processor complex, wherein the first cluster processor complex and first fixed block adapter are configured to provide asynchronous status messaging by transmitting a Read Message to a target storage system, wherein the Read Message requests return of asynchronous event information from the target storage system.

In another embodiment of the present invention, a storage system is provided. The storage system includes a first cluster processor complex, a first fixed block adapter coupled to the first cluster processor complex and a first storage array coupled to the first cluster processor complex, wherein the first cluster processor complex and first fixed block adapter are configured to generate a return message providing asynchronous event information to an initiator in response to receiving a Read Message from the initiator.

In another embodiment of the present invention, a method for providing asynchronous status messaging between storage systems is provided. The method includes generating a return status message providing asynchronous event information to an initiator in response to receiving a Read Message from the initiator and returning the return message on a completed message command.

In another embodiment of the present invention, a method for providing asynchronous status messaging between storage systems is provided. The method includes generating a Read Message requesting asynchronous status information at an initiator and sending the Read Message to a target.

In another embodiment of the present invention, a program storage device readable by a computer is provided. The medium tangibly embodies one or more programs of instructions executable by the computer to perform a method for providing asynchronous status messaging, the method includes sending a Read Message from an initiator to a target, monitoring command completion at the target, determining whether return status data is available in response to the Read Message when a command completes, returning a No Message to the initiator when return status data is not available and returning return status data to the initiator when return status data is available.

In another embodiment of the present invention, a program storage device readable by a computer is provided. The medium tangibly embodies one or more programs of instructions executable by the computer to perform a method for providing asynchronous status messaging, the method includes generating a return status message providing asynchronous event information to an initiator in response to receiving a Read Message from the initiator and returning the return message on a completed message command.

In another embodiment of the present invention, a program storage device readable by a computer is provided. The medium tangibly embodies one or more programs of instructions executable by the computer to perform a method for providing asynchronous status messaging, the method includes generating a Read Message requesting asynchronous status information at an initiator and sending the Read Message to a target.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method, apparatus and program storage device for providing asynchronous status messaging in a data storage system. The present invention provides a Read Message for timely returning asynchronous events to a host initiator or peer subsystem initiator. The asynchronous events may or may not be associated with a given command or logical unit (LUN). The return messages may include status information to an extended command operation.

Figure 1:
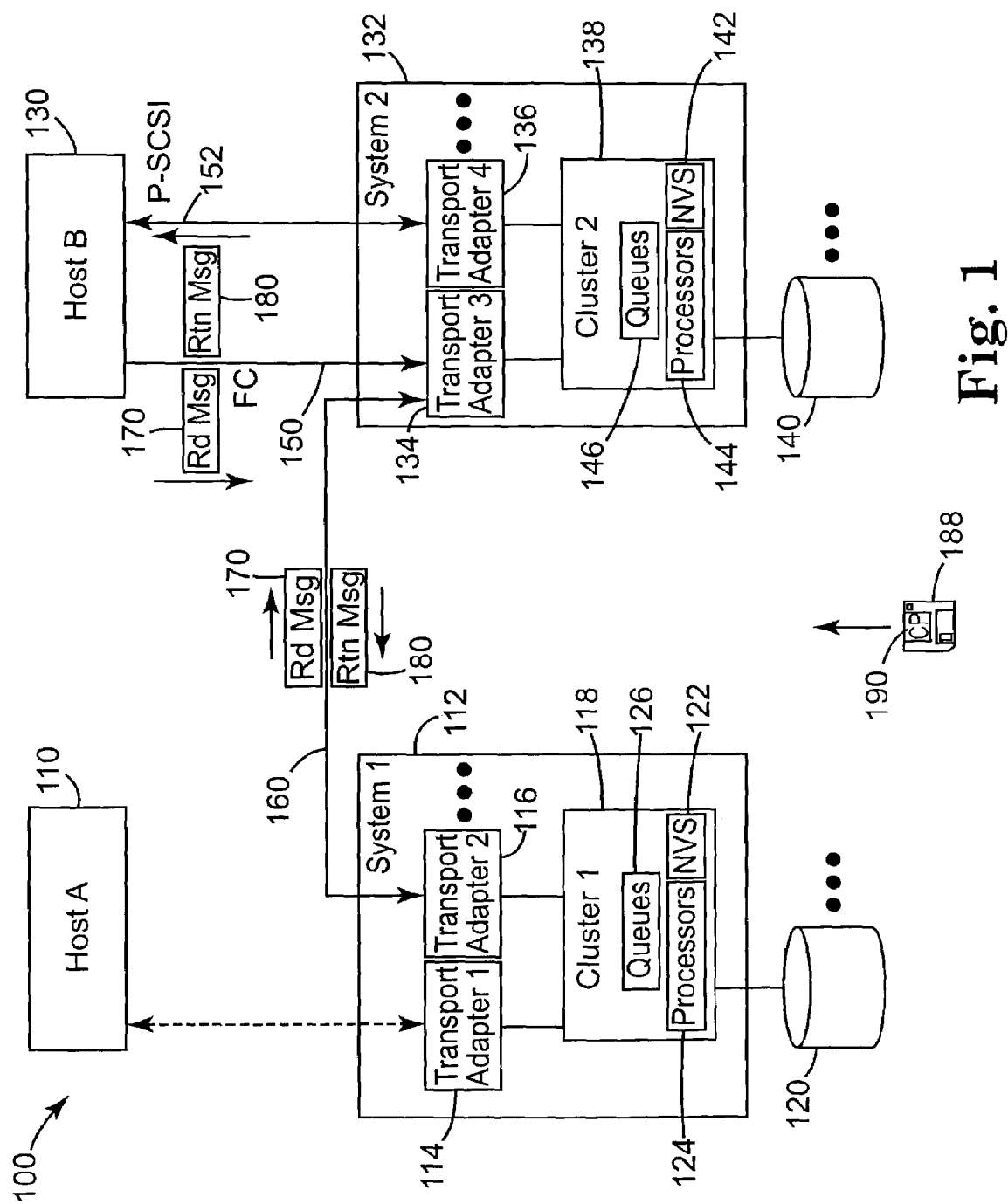
FIG. 1 illustrates a block diagram of a storage system according to the present invention.

FIG. 1 illustrates a block diagram 100 of a storage system according to the present invention. In FIG. 1, Host A 110 is coupled to system 1 112. System 1 112 includes at least one transport adapter (e.g., transport adapter 1 114 and transport adapter 2 116) that is coupled to cluster processor complex 1 118. Cluster processor complex 1 118 is coupled to a first storage system 120. In a like manner, Host B 130 is coupled to system 2 132. System 2 132 includes at least one transport adapter (e.g., transport adapter 3 134 and transport adapter 4 136) that is coupled to cluster processor complex 2. Cluster processor complex 2 138 is coupled to a second storage system 140. Host B 130 is shown coupled to a transport adapter 3 via a fibre channel 150 and to a transport adapter 4 via a parallel physical connection 152. The two storage systems 112, 132 are coupled via an open source connection 160, such as fibre channel, switched fabric or point-to-point, parallel SCSI, etc. The open source connection 160 is coupled to transport adapter 2 116 and transport adapter 3 134. Cluster processor complex 118, 138 are not limited to a single processor complex, but instead may represent a plurality of processor complexes in each system 112, 132 respectively. Accordingly, in such an arrangement each adapter 114, 116 is coupled to each cluster complex represented by 118. The same applies for system 132.

Figure 2:
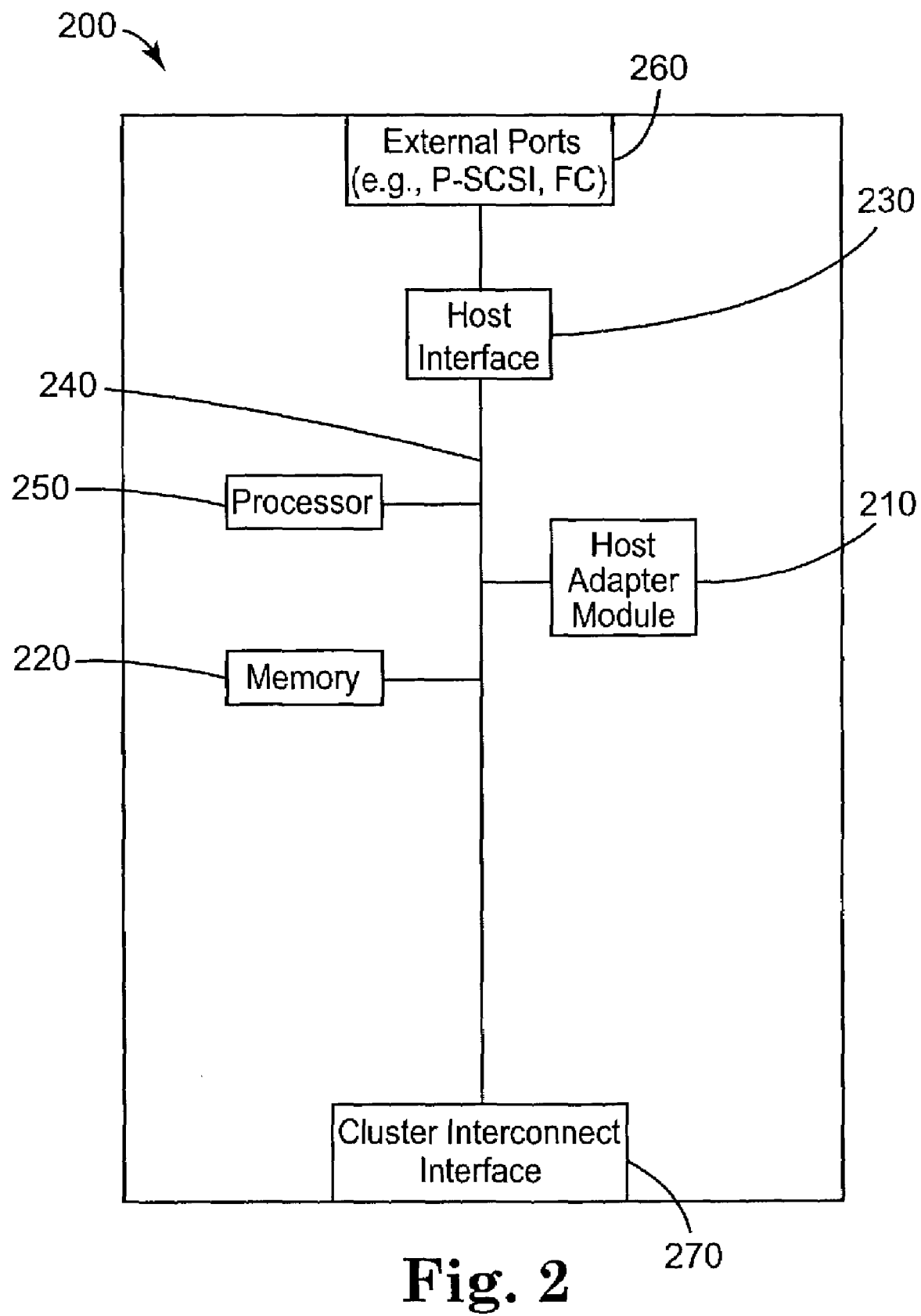
FIG. 2 illustrates one embodiment of a fixed block adapter that may be used in accordance with the present invention.

FIG. 2 illustrates one embodiment of a fixed block adapter 200 that may be used in accordance with the present invention. In FIG. 2, the fixed block adapter includes a host adapter module 210, a memory 220, and a host interface 230 that are interconnected by an internal bus 240, which was used for control of fixed block adapter 200 by a processor 250. The host interface 230 is coupled to external ports 260. The host adapter module 210 transfers information to and from a physical connection via external ports 260. The fixed block adapter 200 may be coupled to the cluster processor complex 118 of FIG. 1, for example, via the cluster interconnect interface 270. The combination of host adapter module 210, memory 220, host interface 230, internal bus 240, processor 250 and cluster interconnect interface 270 are used for providing asynchronous status messaging between fixed block adapter 200 and another fixed block adapter.

As described earlier, proprietary systems use an interrupt protocol to provide synchronous operation between the two systems thereby facilitating messaging and event notification between the two systems. However, open systems, such as SCSI and Fibre Channel Protocol for SCSI (FCP), do not use interrupts. Thus, the primary and secondary systems 112, 132 connected by a physical connection or fibre channel 160 operate asynchronously. Accordingly, asynchronous events on a target SCSI controller cannot be returned to a host initiator or peer subsystem initiator. Such events go undetected by the initiator until a command completes or terminates.

The present invention provides a way to timely return asynchronous events on a SCSI controller (e.g., transport adapter 3 134) to a host initiator or peer subsystem initiator (e.g., transport adapter 116, system 1 112, Host B 130, etc.). The messages that are returned may contain status information to an extended command operation, e.g., a command that previously returned a status presentation, but which still has back end work being performed on a controller; a controller resource transition; or any event that the target controller (e.g., transport adapter 3 134) needs to communicate back to the initiating controller or host initiator (e.g., transport adapter 116, system 1 112, Host B 130, etc.).

Figure 3:
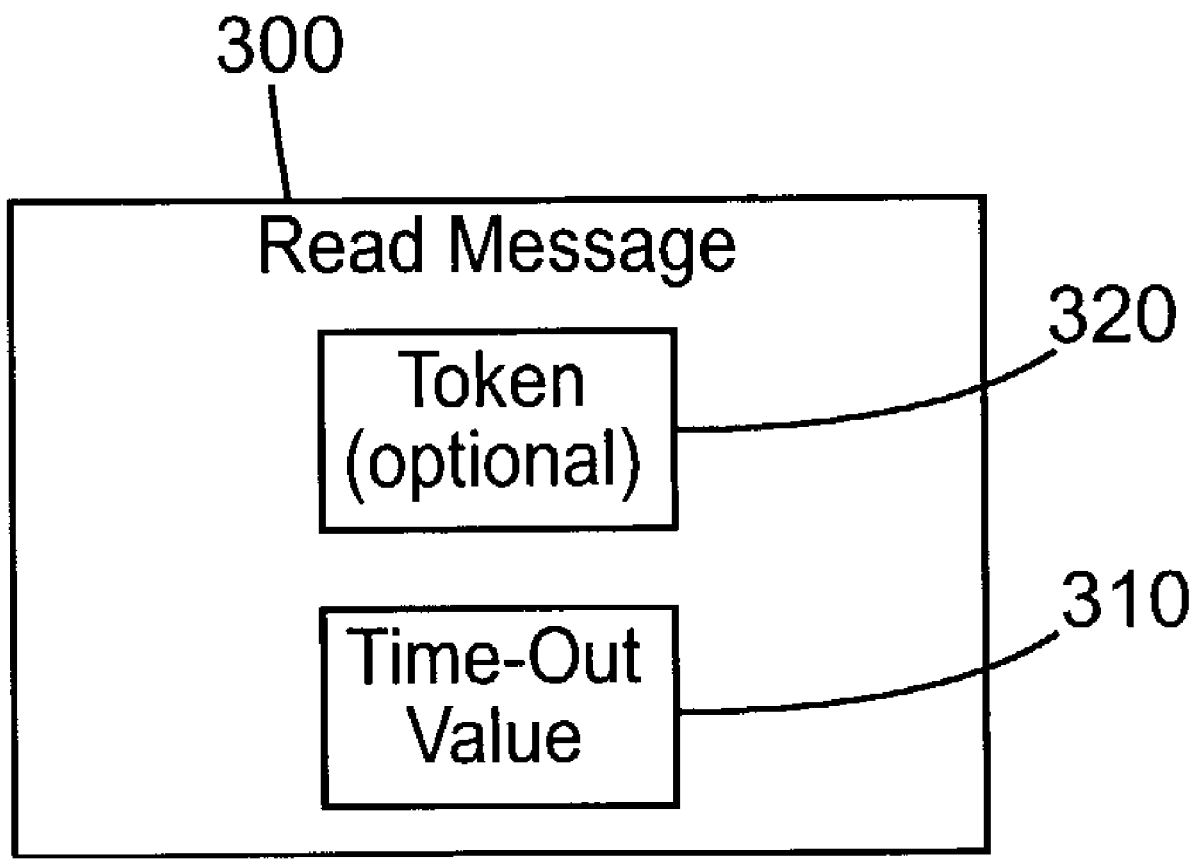
FIG. 3 illustrates a Read Message according to the present invention.

To solve this problem, the present invention provides a new SCSI command that is referred to as a "Read Message." FIG. 3 illustrates a Read Message 300 according to the present invention. In FIG. 3, the Read Message includes a time-out value 310 that is chosen to provide sufficient time for a command to complete. If the command is not completed within the time frame dictated by the time-out value 310, a target controller returns a "No Message" to the host initiator. The Read Message may also include a token 320 that matches the one issued with the original extended command.

Figure 4:
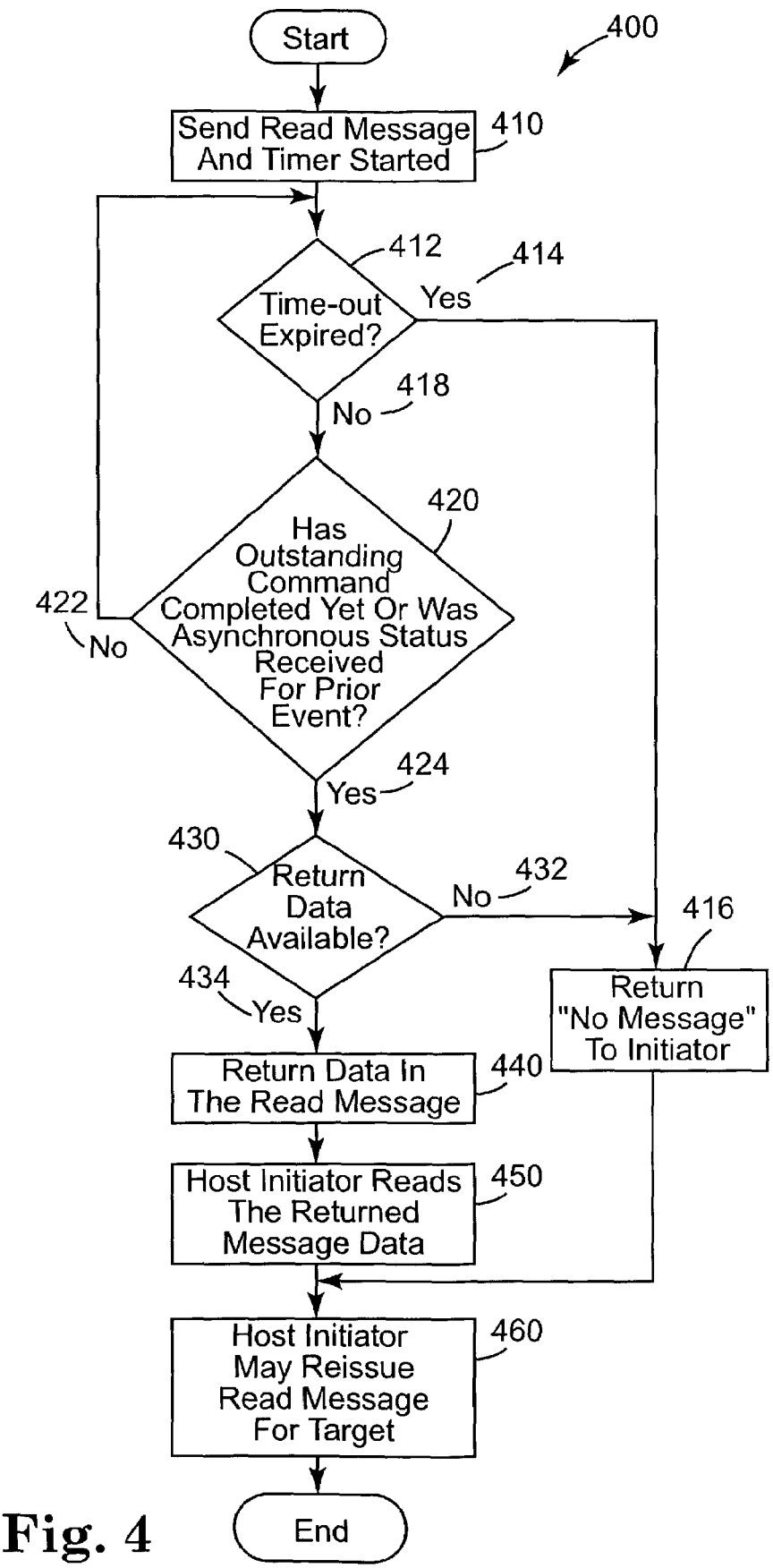
FIG. 4 illustrates a flow chart for the method for providing asynchronous messaging according to the present invention.

FIG. 4 illustrates a flow chart 400 for the method of providing asynchronous messaging according to the present invention. A Read Message is sent from a host initiator to a target controller and a timer is started 410. A Read Message may be directed to the status of the execution of a specific command by specifying a token that matches the one issued with the original extended command, or may be non-specific thereby requesting any asynchronous status information that the target controller may contain for that initiating controller or host. If the initiator desires information related to a specific previously issued extended operation command, the initiator provides the token identifier that matches the command specified at the time the extended operation was issued.

The Read Message is given a time-out value that is sufficiently large to allow completion of most currently executing operations, e.g., 30 seconds. The target controller monitors the time-out parameter to determine whether the time-out is about to expire 412. If the time-out expires 414, the target controller returns a No Message to the host initiator 416. Otherwise 418, the Read Message waits for completion of the executing operation 420 or until asynchronous status for a prior event is returned. Asynchronous events are maintained in the message queue even if there is no Read Message outstanding. However, when a Read Message is received, the queued status is returned immediately. If the command has not completed and no asynchronous status is returned from a prior event 422, the time-out continues to be monitored 412. The target system determines whether there is return data to return to the host initiator 430. If not 432, a No Message is returned to the host initiator so that the host initiator may reissue a Read Message for the target 416. If data is available 434, data is returned to the host initiator in the Read Message 440.

If the Read Message included a token identifier that matches the token specified at the time the extended operation was issued, the target will return message data that indicates the status of the operation matching the token. If there is no matching operation for that token a No Message is returned.

When the Read Message is returned to the host initiator, the host initiator reads the message data 450. After the host initiator reads the message data or after a No Message response is returned to the initiator, the host may re-issue another Read Message command for the target controller to maintain on the target controller's command queue 460.

For purposes of illustration, the present invention will be described with reference to FIG. 1. First, an embodiment of the present invention will be described with system 1 112 monitoring system 2 132. Then, another embodiment of the present invention will be described with Host B 130 acting as a driver of a Read Message to system 2 132. However, those skilled in the art will recognize that the present invention is not meant to be limited to these operational examples. Further, those skilled in the art will recognize that the labels designating roles, such as primary, secondary, initiator, target, Host A, Host B, etc., are used for illustration only and that such roles may change. For example, a target may become an initiator and an initiator may become a target depending upon operational needs.

In a first example, system 1 112 issues a Read Message 170 to system 2 132. The Read Message 170 may be generated in system 1 112, e.g., SCSI interface adapter cards 114, 116. The Read Message 170 is used to support asynchronous status reporting. Asynchronous status reporting involves using asynchronous messages to transfer subsystem information generated by clients to interested hosts or Peer-to-Peer Remote Copy (PPRC) primary controllers. In this example, the message parameters do not specify a specific message so the Read Message will cause any message that is in system 2 132 to be read. The command is given a time-out value, e.g., 30 seconds. However, those skilled in the art will recognize that the present invention is not meant to be limited to any particular time-out value.

If an event happens on system 2 132 from any of the resources, e.g., host bus adapters 134, 136, cluster resources 138 (such as a cache 142 getting low), device 140 (doing self check, detect hardware failure etc), a message is constructed on cluster processor complex 2 138. Message data is returned to system 1 112 on the outstanding message command 180 indicating there is a message information available for system 1 112 (as SCSI data) with good status. The adapter 116 will send mail to cluster processor complex 1 118, which in turn, notifies system 1 internal hosting code running on processor 124 that there was an event on system 2 132. The hosting code running on processor 124 will then issue a Read Message SCSI command 170 to system 2 132. The message 170 may be a read available message that is sent to a specific message ID. System 2 132 receives the Read Message command 170 and returns the message data to the adapter 116 of system 1 112, which in turns is passed on to the internal hosting code running on processor 124.

System 2 132 has the option of returning a No Message to prevent time-out or if no message is available. System 1 112 can abort an outstanding Read Message command on system 2 132 if system 1 112 decides not to wait, or if the message time-out expires. System 1 112 will generally automatically generate a new Read Message 170 in anticipation of the next asynchronous event once the previous Read Message command is complete. Asynchronous events are maintained in the message queue even if there is no Read Message outstanding. However, when a Read Message is received, the queued status is returned immediately.

The type of reporting service of cluster processor complex 2 138 is dependent on the scope of the resource associated with the occurring event. For example, events pertaining to a volume are reported using a volume service, and events associated with a cluster, cache or secondary system warmstart are reported using a cluster service.

In a second example, Host B 130 may act as the driver of a Read Message 170 to system 2 132. Host B 130 can request a non-specific message, i.e., no message ID, or a specific message, i.e., looking for the token that was given to system 2 132 earlier on an extended Vendor Specific system command. The data associated with the Read Message 170 will contain the information from system 2 132.

Figure 5:
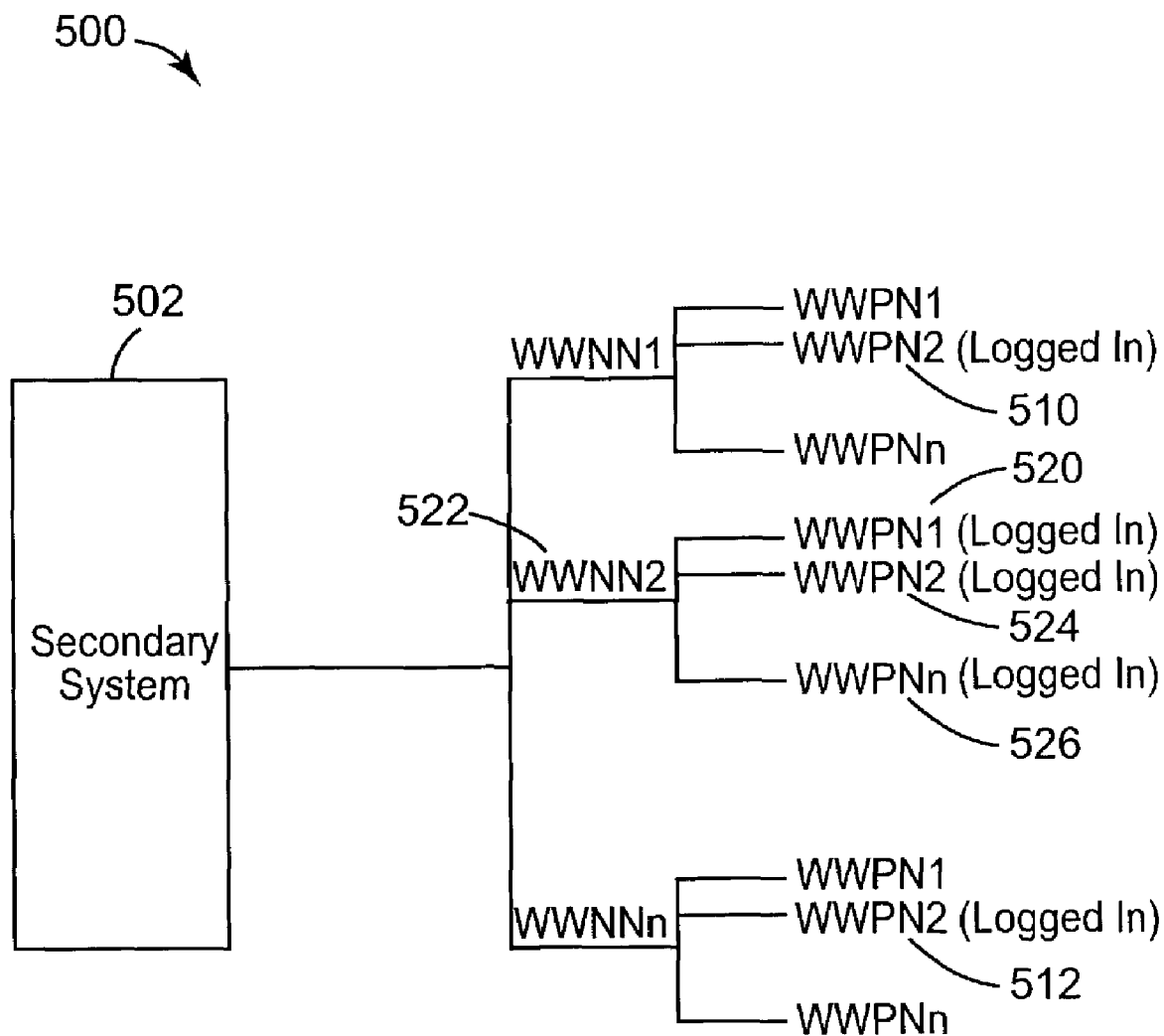
FIG. 5 illustrates asynchronous message delivery according to an embodiment of the present invention.

FIG. 5 illustrates asynchronous message delivery 500 according to an embodiment of the present invention. As shown in FIG. 5, asynchronous messages can be delivered to any one World Wide Port Name (WWPN) on all World Wide Node Names (WWNN) "logged in" to the secondary system 502 at the time the event occurred. In this example, an asynchronous message is sent from the secondary system 502 to WWPNs that are logged in 510, 512, 520, 524, 526.

Asynchronous messages can also be delivered to any one WWPN on any interested WWNN. An "interested" WWNN is one that expects to be notified of a particular subsystem change depending on an earlier indication, e.g., check condition, long busy status, or previous asynchronous status report. In this example, an asynchronous message is sent from the secondary system 502 to WWPN1 520 on WWNN2 522. Asynchronous messages can also be delivered to all WWPNs (logged into secondary system) on every interested WWNN. In this example, an asynchronous message is sent from the secondary system 502 to WWPN1 520, WWPN2 524 and WWPNn 526 on WWNN2 522.

In one embodiment of the present invention, there may be only one active message per initiator per port per cluster. Further, only one asynchronous message buffer may be created for each event that needs an asynchronous notification. Asynchronous messages are dispatched in the order they were queued. However, it is not necessary that the intended receiver receives the messages in the same order. In error conditions, the messages may be out of order (e.g. A warmstart complete takes precedence over other messages).

Figure 6:
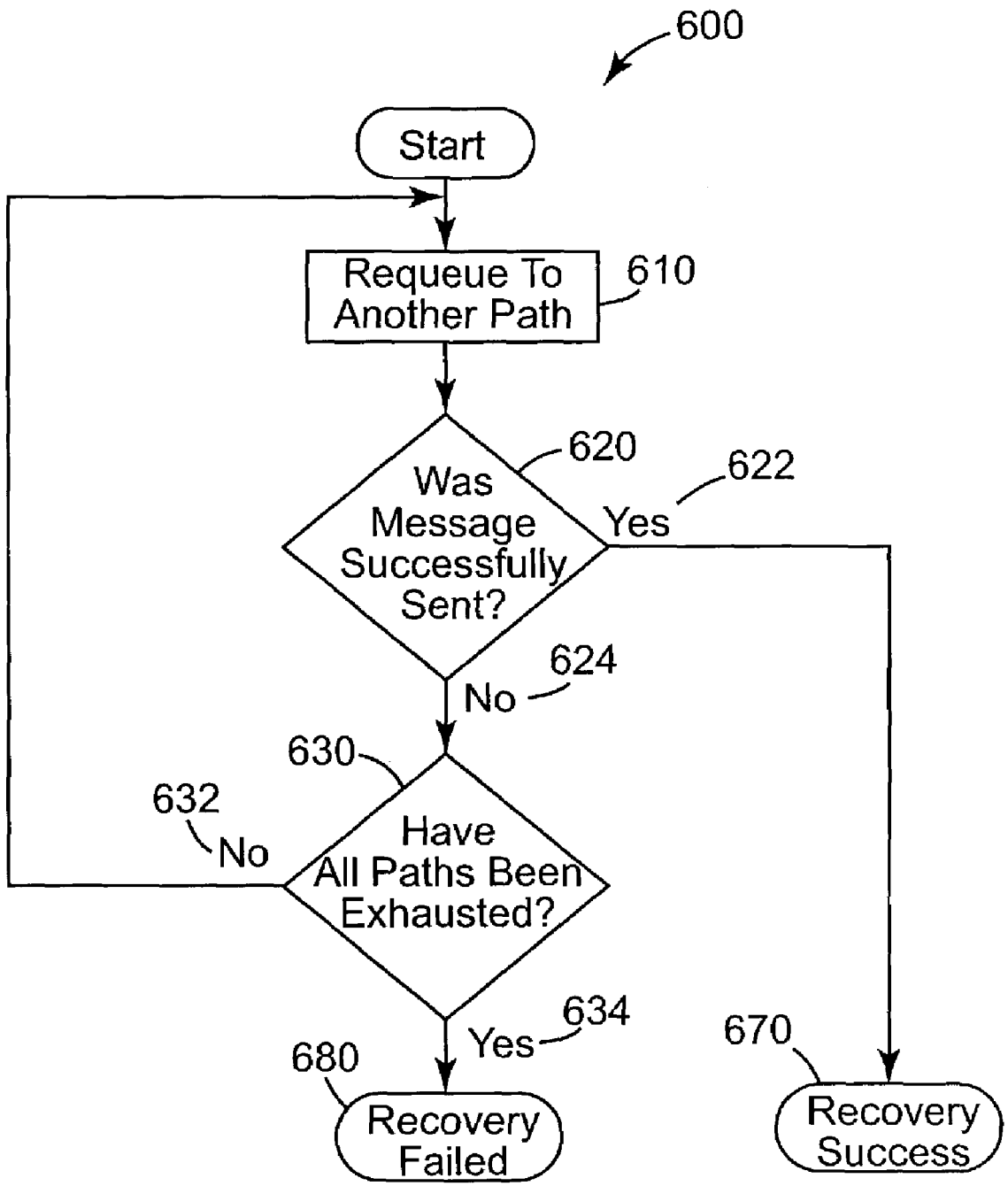
FIG. 6 illustrates a recovery process according to the present invention.

FIG. 6 illustrates a recovery process 600 according to the present invention. Cluster processor complex message services use path failover recovery as appropriate for the given message type. For example, messages are re-queued to another available path to the same Primary WWNN if the current WWPN message transfer fails 610. The messages are monitored to determine whether the messages are sent successfully 620. If successfully sent 622, the failover recovery process is successful 670. If not 624, a determination is made whether all paths have been exhausted 630. If not 632, the message is requeued to another path 610. If all paths have been exhausted 634, the recovery process fails 680. This recovery process 600 is continued until the message is successfully sent or all available paths are exhausted. Messages buffers for inactive WWPNs are not to be deleted unless the subsystem has reached or exceeded an internal resource threshold or have been aged out. Asynchronous messages will not be remembered across Failover or Quiesce of a cluster.

Referring again to FIG. 1, the cluster processor complex 2 138 is responsible for resending messages lost due to the target adapter 134 going through a warmstart. All asynchronous message buffers survive warmstarts. In addition, the queue ordering of the messages of cluster processor complex 2 138 is maintained. Messages, however, may be stale after a warmstart. The primary system 112 is capable of handling a second warmstart. For example, target adapter 134 sends out a warmstart in progress notification (e.g., notification A). The warmstart completes and cluster processor complex 2 138 queues an out of warmstart notification for Host A 110. Then, cluster processor complex 2 138 dispatches the warmstart complete message. Immediately after the target adapter 134 presents status to the primary system 112 after transmitting the warmstart complete notification, cluster processor complex 2 138 goes through another warmstart. The primary system 112 now believes that the secondary system 132 is out of warmstart while the secondary system 132 is actually going through the second warmstart. Thus, the primary system 112 is capable of handling a second warmstart.

Every asynchronous message has a high, medium or low priority. This priority is determined by cluster processor complex 2 138 when allocating message buffers. This priority does not change dynamically. On the primary system 112, a client is capable of handling multiple asynchronous reports with the same messages generated due to error recovery on the secondary system 132. It is not guaranteed that every message created will reach its intended recipient (s). A secondary system 132 is not responsible for resending a message if the primary system 112 loses the message after a primary adapter 116 has received the message and the ending status from the secondary system 132.

Figure 7:
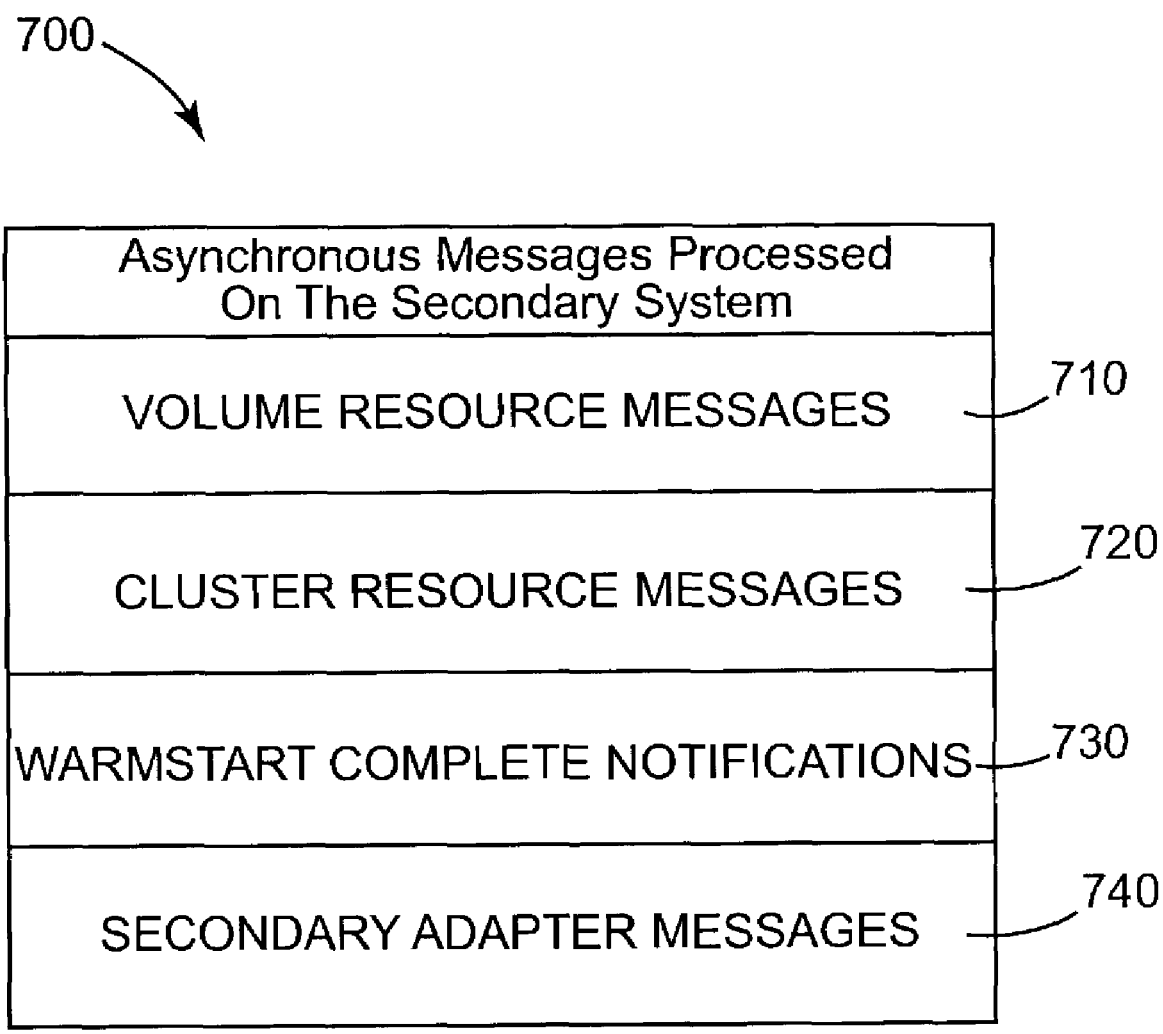
FIG. 7 illustrates examples of asynchronous messages processed on a secondary system according to the present invention.

FIG. 7 illustrates examples of asynchronous messages 700 that are processed on a secondary system according to the present invention. FIG. 7 illustrates that the asynchronous messages that are processed on a secondary system according to the present invention may include volume resource messages 710, cluster resource messages 720, warmstart complete notifications 730 and secondary adapter messages 740. The asynchronous messages that may be processed on a secondary system will be described herein with reference to FIG. 1.

The first type of message processed on a secondary system according to the present invention is a volume resource message 710. A cluster processor complex 138 provides asynchronous volume notification to clients on a primary system 112. Examples of asynchronous volume notifications are "out of long busy" notification and "out of simulated long busy" notification. These messages have a medium priority.

When a primary system 112 issues a command (control or data transfer) to a secondary system 132 for a secondary PPRC volume, the operation will fail if the volume state is not ready. If the volume is not ready because of a temporary error, the volume is in a Long Busy condition during the error recovery process. A command issued to a volume during that recovery period is failed with Long Busy check condition status.

Both CKD (count, key, data) and fixed block (FB) systems are responsible for calling fixed block for their respective volumes to mark the volume that it owes a notification. The cluster processor complex 138 is responsible for maintaining the notification table for both CKD and FB volumes. The cluster processor complex 138 is responsible for providing the service to report the asynchronous volume status. The cluster processor complex 138 is also responsible for resetting the notification owed bit in the table once the message is either sent or permanently failed.

When the cluster processor complex 138 detects an out of long busy or simulated long busy, the cluster processor complex 138 makes a decision on whether an asynchronous message 180 needs to be created and sent to the primary system 112. An asynchronous volume notification may be stale by the time the message reaches the primary system 112.

Also copy services provide a function that given a secondary volumeID as an input, returns its corresponding Primary volumeID, a WWNN and a return code indicating whether it is valid or not. That is, if the input volumeID is not a PPRC Secondary volume, then the return code will indicate that it's not a secondary system 132 and the output data will not be valid.

The client on the primary system 112 requires that asynchronous volume based notifications are serialized. The cluster processor complex 138 maintains a cluster centric queue where all volume based asynchronous messages are queued. If there are no outstanding asynchronous messages for that volume, the cluster processor complex 138 generates a "PPRC Secondary volume attention" asynchronous message to be delivered to the primary system 112. The client on the primary system 112 is then responsible to send a Read command to the secondary system 132 with a suborder Read Message and a message ID OFF to read the outstanding asynchronous message. The client on the primary system 112 continues to send the Read message until there are no more outstanding asynchronous messages to be presented to the primary system 112. Volume resource messages are only transferred to the primary system 112/Host A 110 if previous I/O request to that volume was Check Conditioned for the reason leading to the notification.

A second type of asynchronous message processed on the secondary system 132 according to the present invention is a cluster resource message 720. Sequential Fast Write (SFW) Notification is a cluster centric message indicating that Sequential Fast Write data has just transitioned a predetermined percentage of cache space. An asynchronous message is sent to all WWPNs on interested primary nodes logged into the secondary system at the point of time the message is generated. These messages have a medium priority.

When an SFW I/O request comes in from the primary system 112, the cluster processor complex 138 requests a cache assistant (CA) to provide SFW cache (e.g., NVS 142) and calls a CA service to query the amount of cache used for SFW storage. When the cluster processor complex 138 detects a predetermined High Watermark has been encountered, the cluster processor complex 138 requests a cluster processor complex service to report an asynchronous cluster event with status of SFW threshold exceeded. This notification is sent to the primary system 112 each time a new request hits this High Watermark level. The cluster processor complex 138 does not notify a Primary WWNN of this level if the cluster processor complex services has already sent this message. The first time a "High Watermark signal" is generated (either after a cold boot or if the last SFW notification was a "Low Watermark" notification), the cluster processor complex 138 registers with CA to request a notification when the Low Watermark is reached. This notification request is sent only once.

When the "Low Watermark" is reached, the cluster processor complex 138 sends a message to all WWPNs of interested Primary WWNNs logged in at that particular moment. A Primary WWNN becomes an interested WWNN when it receives a "High Watermark" message. There will be no "Interested Primary WWNNs" in the time interval after the "Low Watermark" messages have been sent and when the first "High Watermark" message is requested to be sent. The cluster processor complex 138 sends the "High Watermark" and "Low Watermark" messages to the initiator on the primary system 112 in the order they were generated. The cluster processor complex 138 reserves the right not to send a "High Watermark Reached" message to a newly logged in WWPN if the WWNN associated with that WWPN has already received a "High Watermark Reached" notification.

The third asynchronous message is the warmstart complete notification 730. This message is generated when the cluster processor complex 138 completes a predetermined phase of a warmstart. It is guaranteed that this message is queued on top of the high priority asynchronous message queue by the end of the predetermined phase. This asynchronous message is sent to every active WWNN associated with the secondary system at the time of generation of the message. An active Primary WWNN is one that has at least one initiator on a primary system 112 logged into the secondary system 132 on its behalf. It is possible that a warmstart complete notification may be received multiple times by a primary subsystem 112—one from each cluster 138 on the secondary system. The warmstart completion notification messages may be queued, but not necessarily sent, prior to the cluster processor complex 138 checking back on the warmstart phase. Thus, completion of the phase does not indicate all notifications were sent.

The fourth asynchronous message is a secondary adapter message 740. The secondary cluster processor complex 138 has no responsibilities for messages of the secondary adapters 134, 136.

For an asynchronous message on a primary cluster processor complex 118, the adapter 116 of the primary system 112 receives an ending status for the non-specific read. The adapter 116 then builds and sends mail (Asynchronous Status Report Request) to the cluster processor complex 118. The cluster processor complex 118 forwards the message packet to the client, e.g., Copy Services. After reporting the asynchronous status to the client, the cluster processor complex 118 responds to the adapter 116 with response mail (Asynchronous Status Report Response) to acknowledge the completion of the report.

Every asynchronous message has either a high, medium or low priority. Cluster processor complexes 118, 138 maintain two cluster centric queues 126, 146 for this purpose. Every message generated, with the exception of warmstart complete, is queued at the end of the queue 126, 146.

The asynchronous message buffer queue 146 of the secondary cluster processor complex 138 is scanned to dispatch asynchronous messages. The dispatching mechanism does not process or interpret the message. As a part of the login process, the target adapter 134 helps the secondary cluster processor complex 138 identify whether this initiator on the primary system 112 is a host or a PPRC Primary. If the logged-in initiator on the primary system 112 is a PPRC Primary, then the PPRC supports asynchronous messages. Alternatively, a host can receive asynchronous messages when it indicates that it supports asynchronous status. This is done using a Write-Set System Characteristics suborder. A scan always starts at the head of the queue 146. One or more messages can be dispatched during one scan loop. The low priority queue is scanned once for every three times the high priority queue is scanned. There are two methods for dispatching messages.

The first method for dispatching messages is the parallel mode asynchronous message dispatch. In the first method, the scan loop starts at the head of the queue 146. The message is dispatched to a recipient (WWPN or WWNN) if it has all necessary resources. If, however, the message could not be sent because all necessary resources were not available, a subsequent message that needs to go to the same resource will not be sent even if all resources are available by the time the scan loop reaches this subsequent message.

The second method for dispatching messages is the sequential mode of asynchronous message dispatching. In the second method, when a predetermined threshold of a cluster processor complex 138 is exceeded, a single trusted computing base (TCB) is used for dispatching asynchronous messages. The trusted computing base (TCB) includes everything in a computing system that provides a secure environment. TCB can be used to check a file's permissions, checksum, size, and other attributes. Only the high priority queue is scanned when the dispatch mode is set to sequential. The dispatching mechanism switches from the parallel mode to a serial mode when usage of TCB resources on a subsystem exceeds a predetermined threshold of the cluster processor complex 138. The dispatching mechanism switches back to the parallel mode when the TCB resources in the subsystem fall below the low threshold (e.g. 50 percent).

Buffer aging is used to clean up old messages in order to free up resources. Asynchronous message buffers 142 have a time based aging. The decision on whether to delete an asynchronous message buffer is based on the age of the buffer. For example, the lifetime of a low priority message may be set to be twice as much as that of a high priority message.

The process illustrated with reference to FIGS. 1-7 may be tangibly embodied in a computer-readable medium or carrier, e.g. one or more of the fixed and/or removable data storage devices 188 illustrated in FIG. 1, or other data storage or data communications devices. The computer program 190 may be loaded into memory (not shown) of any of the devices to configure them for execution. The computer program 190 include instructions which, when read and executed by a processor, such as processors 124 of FIG. 1, causes the devices to perform the steps necessary to execute the steps or elements of the present invention. Those skilled in the art will recognize that code for performing the method for providing asynchronous status messaging for a SCSI controller according to the present invention may be implemented on any and/or all of the devices, e.g., processors 124 in cluster 1 118, adapters 114, 116, processors 144 in cluster 2 138, adapters 134, 136, Host A 110, Host B 130, etc.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A storage system, comprising:
a first storage system, the first storage system comprising a first cluster processor complex, a first fixed block adapter and a first storage array;
a first host coupled to the first storage system;
a second storage system, the second storage system comprising a second cluster processor complex, a second fixed block adapter and a second storage array, the second storage system queuing event information in a memory as the event information becomes available;
a second host coupled to the first storage system; and
an open source path coupling the first and second fixed block adapter;
wherein the first cluster processor complex and first fixed block adapter of the first storage system are configured to provide asynchronous status messaging by transmitting a Read Message to the second fixed block adapter, wherein the Read Message requests return of asynchronous event information from the second storage system and the second fixed block adapter asynchronously returning event information queued in the memory of the second storage system in response to receipt of the Read Message.

2. The storage system of claim 1 wherein the asynchronous event is not associated with a specific command.

3. The storage system of claim 1 wherein the Read Message includes a token for identifying a previously issued command.

4. The storage system of claim 3 wherein the Read Message includes a time-out parameter for setting a time frame for returning event information in response to the Read Message.

5. The storage system of claim 1 wherein the Read Message includes a time-out parameter for setting a time frame for returning event information in response to the Read Message.

6. The storage system of claim 5 wherein the Read Message is received by the second storage system from the second host.

7. The storage system of claim 5 wherein the Read Message is received by the second storage system from the first storage system.

8. The storage system of claim 5 wherein the return message provides event information comprising message data indicative of a status for an operation matching a token in the Read Message.

9. The storage system of claim 5 wherein the return message provides asynchronous event information comprising a No Message indicating no matching operation exits for a token in the Read Message.

10. A storage system, comprising:
   a first cluster processor complex;
   a first fixed block adapter coupled to the first cluster processor complex; and
   a first storage array coupled to the first cluster processor complex;
   wherein the first cluster processor complex and first fixed block adapter are configured to provide asynchronous status messaging by transmitting a Read Message to a target storage system queuing event information in a memory as the event information becomes available, wherein the Read Message requests asynchronous event information from the target storage system in response to receipt of the Read Message by the target system.

11. A storage system, comprising:
   a first cluster processor complex queuing event information in a memory as the event information becomes available;
   a first fixed block adapter coupled to the first cluster processor complex; and
   a first storage array coupled to the first cluster processor complex;
   wherein the first cluster processor complex and first fixed block adapter are configured to generate a return message providing asynchronous event information to an initiator in response to receiving a Read Message from the initiator.

12. A program storage device readable by a computer, a medium tangibly embodying one or more programs of instructions executable by the computer to perform a method for providing asynchronous status messaging, the method comprising:
   sending a Read Message from an initiator to a target;
   monitoring command completion at the target;
   determining whether return status data is available in response to the Read Message when a command completes;
   returning a No Message to the initiator when return status data is not available; and
   returning return status data to the initiator when return status data is available.

13. The program storage device of claim 12 further comprising monitoring a time-out parameter provided by the Read Message, and wherein the monitoring command completion at the target further comprises continuing to monitor command completion at the target until the command completes or the time-out parameter expires, a No Message being returned to the initiator when the time-out parameter expires before completion of a command.

* * * * *